United States Patent [19]
Hyoi

[11] Patent Number: 5,914,768
[45] Date of Patent: Jun. 22, 1999

[54] EYEGLASS FRAME HAVING METAL-AND-STRING RIMS

[75] Inventor: Isao Hyoi, Fukui-ken, Japan

[73] Assignee: OPCOM Inc., Fukui, Japan

[21] Appl. No.: 09/009,934

[22] Filed: Jan. 21, 1998

[30] Foreign Application Priority Data

Jul. 28, 1997 [JP] Japan ................... 9-218232
Aug. 29, 1997 [JP] Japan ................... 9-250091

[51] Int. Cl.⁶ ............................................. G02C 1/04
[52] U.S. Cl. ..................... 351/103; 351/106; 351/154
[58] Field of Search ................................. 351/103, 104, 351/105, 106, 109, 154

[56] References Cited

U.S. PATENT DOCUMENTS 5,135,296  8/1992  Lindberg et al. ................. 351/103

*Primary Examiner*—Huy Mai
*Attorney, Agent, or Firm*—Nikaido, Marmelstein, Murray & Oram LLP

[57] ABSTRACT

Disclosed is an improved eyeglass frame having two upper half-rims of arc-shaped metal wires and two lower half-rims of high-tension strings to encircle and hold associated lenses. Each arc-shaped metal wire has hooks formed on its opposite ends, and each high-tension string has loops formed on its opposite ends to be caught by the hooks of the arc-shaped metal wire. The arc-shaped metal wire is relatively thick, and it is partly exposed from the circumferential groove of the lens, thereby permitting the bridge and temple to be soldered directly to the exposed portions of the metal wire. This arrangement has the effects of significant reduction of manufacturing cost and giving a neat appearance to the frame.

6 Claims, 4 Drawing Sheets

EYEGLASS FRAME HAVING METAL-AND-STRING RIMS

BACKGROUND OF THE INVENTION

1. Field of the Invention

The present invention relates to an eyeglass frame having metal-and-string rims.

2. Description of Related Art

An eyeglass frame having metal-and-string rims is well known as one type of eyeglass frame. As shown in FIG. 9, it has two upper half-rims of arc-shaped metal wires "a" and two lower half-rims of high-tension strings "b" to encircle and hold associated lenses "c". The upper half-rims of arc-shaped metal wires "a" are connected by an intervenient bridge "d", and each upper half-rim "a" has a temple hinged thereto via an associated temple-joint "e".

The upper half-rim "a" is made of a possible thinnest wire, say 0.6 millimeters in diameter, in the hope of making the upper rim least noticeable and, at the same time, expanding the visual field to the possible extensive limit. In almost all cases the rim wire is contained completely in the circumferential groove of the lens. Likewise, the string "b" is contained completely in the circumferential groove of the lens, and this requires that the diameter of the rim wire be equal to that of the string "b". Such a thinnest rim wire, however, can have no sufficient strength for the eyeglass frame. Also, disadvantageously the intervenient bridge and the opposite temple-joints cannot be soldered directly to the rim wire because it is not exposed from the circumferential groove of the lens "c".

The upper half-rim "a", therefore, has reinforcement pieces "f" soldered to its opposite ends, and the bridge "d" and the temple are soldered to the opposite outer-reinforcement pieces "f" of the upper half-rim "a", which opposite outer-reinforcement pieces "f" are curved and laid on the circumference of the lens "c". The reinforcement pieces "f" have an increased strength compared with the rim wire, and therefore, the force applied to the frame is liable to be concentrated to the boundary "g" between the reinforcement piece "f" and the upper half-rim "a". As a result, the frame is often broken at the rim-to-reinforcement joint boundary "g". The rim wire portion lying under the rim-to-reinforcement joint boundary "g" was heated and softened in soldering, and therefore its strength was lost significantly. Sometimes the lens is so badly stressed at the rim-to-reinforcement joint boundary "g" that it may get a crack there.

As for the high-tension string "b" each reinforcement piece "f" has two small apertures made on its lower end, and one or the other end of the string "b" threads these apertures as seen from FIG. 10 before being fixed to the reinforcement piece "f". The string "b" is stretched to allow the aperture edges "h" to somewhat bite the string "b", thereby preventing the slipping-off of the string "b" from the apertures. As a result, however, the string "b" is likely to be cut there sooner or later (see FIG. 10, "h").

Such an eyeglass frame having metal-and-string rims is displayed for sale with dummy lenses fitted therein, and when sold, the dummy lenses are replaced by real lenses. At the same time, the strings "b", which are supposed to have scars made by the aperture edges "h" of the reinforcement pieces "f", must be replaced by new strings. The breaking strength of the string "b" is measured to be approximately 3.6 kilograms when the string is bent around the aperture edge "h", thereby allowing it to bite the string "b".

SUMMARY OF THE INVENTION

The present invention aims at solution of the above described problems. One object of the present invention is to provide an improved eyeglass frame having metal-and-string rims, guaranteed to be free of breakage of high-tension strings, and making it unnecessary to change the strings for new ones when changing the dummy lenses for real ones. Another object of the present invention is to provide an improved eyeglass frame having metal-and-string rims, permitting the intervenient bridge and the joint-pieces to be soldered directly to the upper wire rims without using reinforcement pieces, and guaranteed to be free of excessive concentration of increased stress which would cause the cracking of lenses.

To attain these objects an eyeglass frame having two upper half-rims of arc-shaped metal wires and two lower half-rims of high-tension strings to encircle and hold associated lenses, said two upper half-rims of arc-shaped metal wires being connected by an intervenient bridge, and each of said two upper half-rims having a temple connected thereto via an associated temple-joint is improved according to the present invention in that each of said upper half-rims of arc-shaped metal wires has hooks formed on its opposite ends, and each of said lower half-rims of high-tension strings has loops formed on its opposite ends to be caught by said hooks. For example (although not restrictive), the loop can be formed by looping the end of the string and by fastening the loop end with a crimping metal. The crimping metal has indentations made inside, thereby preventing the slipping-off of the string end from the crimping metal. Alternatively each lower half-rim may have engagement pieces fixed to its opposite ends to be caught by the hooks.

Each arc-shaped metal wire is large in diameter enough to be partly exposed from the circumferential groove of the associated lens, thereby allowing the exposed portion of the arc-shaped metal wire to be connected directly to the intervenient bridge and the temple-joint by soldering. The rim wire is thicker than the conventional rim wire (0.6 millimeters thick), and is about 1.0 millimeters. Its cross section may be circular, elliptical or of any other shape. The circumferential groove of the lens is 0.6 millimeters wide as in the conventional lens, but the circumferential groove is chamfered or rounded at its opposite edges, thereby facilitating the fitting and setting of the thick wire in the circumferential groove of the lens. The thick rim wire has a good strength against breaking, and it cannot be softened by the heating in soldering.

Two upper half-rims of arc-shaped metal wires and the intervenient bridge may be composed of a single wire, which is large in diameter enough to be partly exposed from the circumferential groove of the associated lens. This version may be advantageously used as an extra front-suspending frame to be applied to a pair of eyeglasses.

Other objects and advantages of the present invention will be understood from the following description of eyeglass frame according to preferred embodiments of the present invention, which are shown in accompanying drawings.

DESCRIPTION OF THE PREFERRED EMBODIMENTS

Figure 1:
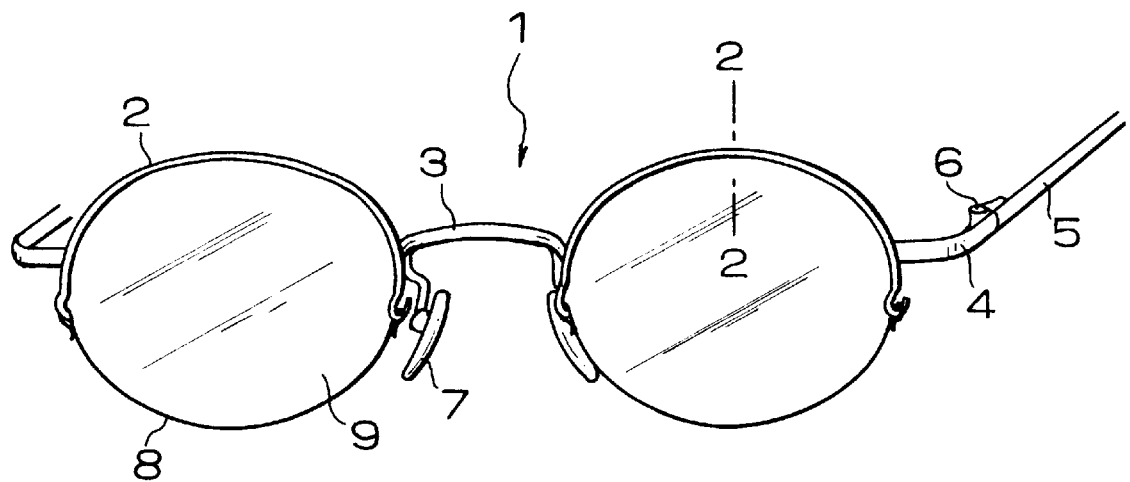
FIG. 1 is a perspective view of a pair of eyeglasses using a metal-and-string frame according to a first embodiment of the present invention.

Referring to FIG. 1, an eyeglass frame 1 has two upper half-rims 2 of arc-shaped metal wires and two lower half-rims 8 of high-tension strings to encircle and hold associated lenses 9. The two upper half-rims of arc-shaped metal wires 2 are connected by an intervenient bridge 3. Each upper half-rim has a temple-joint 4 soldered to its outer edge, and a temple 5 is connected to the temple-joint by a hinge 6, thereby permitting the temple 5 to be foldably closed flat or opened upright. The bridge 3 has nose pads 7 swingably attached to its lower ends. Each upper half-rim 2 of arc-shaped metal wire has a tension string 8 connected to its opposite ends.

The eyeglass frame according to the present invention is structurally similar to a conventional eyeglass frame of same type, but is distinguishable from the conventional eyeglass frame structure in that it uses a metal wire thicker than the one used in the conventional eyeglass frame. Specifically the metal wire 2 is large in diameter enough to be partly exposed from the circumferential groove 10 of the lens 9, as seen from FIGS. 2(a) and 2(b).

Figure 2A:
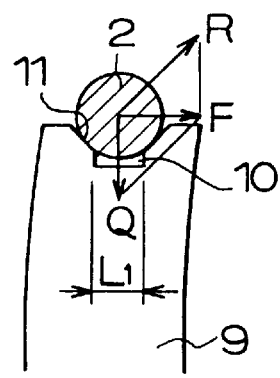
FIGS. 2a and 2b are enlarged cross-sections of the pair of eyeglasses taken along the line 2—2 in FIG. 1.
Figure 2B:
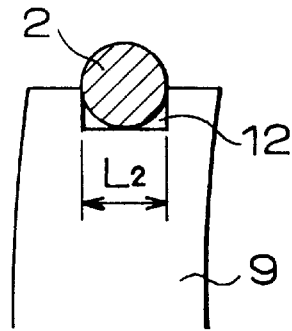

As seen from FIG. 2(a), the width $L_1$ of the circumferential groove of the lens is 0.6 millimeters as in the conventional lens, but the circumferential groove of the lens is chamfered to form the divergent surface 11. The metal wire 2 whose diameter is equal to 1.0 millimeter is snugly laid on the divergent surface 11 of the chamfered groove 10. As for the circumferential groove of the lens 9 it may be made its width $L_2$ equal to the diameter of the metal wire 2 as shown in FIG. 2(b), allowing the lower half of the metal wire 2 is snugly fitted in the rectangular circumferential-groove 12 of the lens 9. In either case the upper half-rim 2 is exposed from the circumferential groove 10 or 12 of the lens, permitting the soldering of the bridge 3 or the joint-piece 4 to the exposed portion of the metal wire 2. Thus, no reinforcement pieces are required.

Figure 3A:
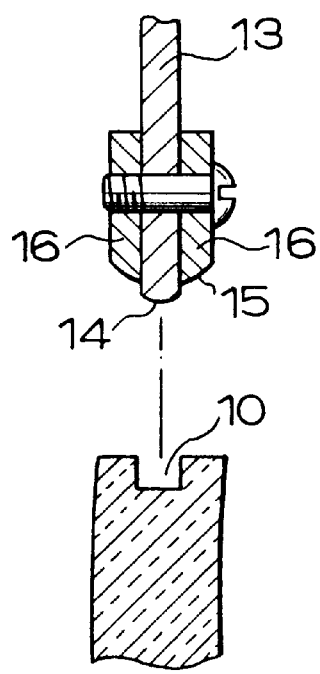
FIGS. 3a and 3b show chamfering tool to be used in making a divergent circumferential groove in the lens.
Figure 3B:
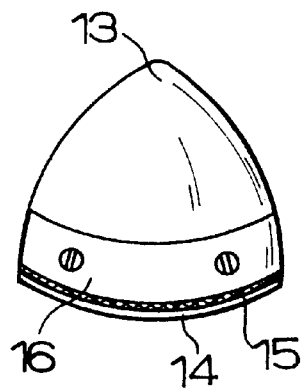

Again, referring to FIG. 2(a), the circumferential groove 10 can be made on the circumference of the lens 9 with a conventional groove cutter because the circumferential groove 10 has the same width (0.6 millimeters) as the conventional one. Thereafter, the rectangular groove 10 is chamfered with a chamfering tool such as shown in FIGS. 3(a) and 3(b). A sector plate 13 is 0.5 to 0.6 millimeters thick, and its lower arc section is sandwiched between the opposite files 16, each having an inclined rough face 14.

The chamfering tool is applied to the circumference groove 10 with its opposite files 16 put on the opposite walls of the rectangular groove, rubbing down through hard surfaces 15 until the circular arc 14 has reached the bottom of the rectangular groove 10. To adjust the divergent size of the chamfered surfaces the opposite files 16 can be adjusted in position by loosening the screws and by displacing the opposite hard surfaces 15 apart from the circular arc 14 of the sector plate 13. Assuming that a force F is applied to the metal wire 2, which force can be divided into a vertical component Q directed to the bottom of the groove and an oblique component R extending in parallel direction to the divergent surface 11 (see FIG. 2(a)). If the force F is strong enough for its oblique component R to cause the metal wire 2 to climb the divergent surface, the metal wire 2 will be made to come off from the circumferential groove of the lens 9.

As for the relatively wide groove 12 shown in FIG. 2(b) the groove is about 1.0 millimeter wide, and cannot be machined with an ordinary groove cutter such as used in making a relatively narrow groove (0.6 millimeter wide) in the conventional lens. The relatively wide groove 12, however, can be made by displacing the ordinary groove cutter laterally, provided that the lens is thick enough to allow the lateral displacement of the ordinary groove cutter. The use of relatively thick metal wire will contribute to the increasing of the strength and rigidity of the frame, as for instance a 1.0 millimeter thick wire has an area 2.8 times as large as a 0.6 millimeter thick wire in cross section, and the relatively thick wire has a distortion resistance against external force about 7.7 times as strong as the relatively thin wire in terms of the secondary moment.

Figure 4:
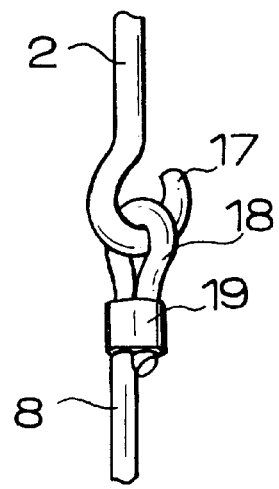
FIG. 4 shows how the loop of the string is caught by the hook of the metal wire.
Figure 5:
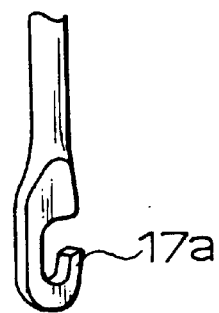
FIG. 5 shows another example of the hook of the metal wire.

The tension string 8 is fixed to the opposite ends of the metal wire rim by permitting the loop of each end of the tension string 8 to be caught by the counter hook 17 as seen from FIG. 4. The loop of the string end is fastened with a crimping metal 19. As an alternative for the bending of the metal wire end 2 in the shape of hook 17 it can be formed by stamping the metal wire end 2 into the shape of hook 17a as seen from FIG. 5. Otherwise, a hook piece may be soldered to the end of the metal wire.

As for the string having loops formed at its opposite ends each loop can be formed by looping each end of the string and by fastening to the string by a crimping metal 19 as shown in FIG. 4. The crimping metal 19 may have indentations made inside. When the crimping metal 19 is crimped to the loop end, the indentations will bite the string 8 to prevent the slipping-off of the string end from the crimped metal 13. Alternatively the loop can be formed by looping each end of the nylon string and by heating and melting the loop end for fastening. The hooking of the string to form the lower rim according to the present invention is much more stable and reliable in holding the lens than the conventional fastening of the string by threading the string through the apertures of the flattened-and-apertured metal wire end; there is a fear of the string being bitten by the sharp edge of the aperture.

The pulling strength of the conventional fastening of the string is about 3.6 kilograms whereas the pulling strength of the crimping and hooking of the string according to the present invention is about 8.4 kilograms, more than twice as much as the pulling strength of the conventional fastening of the string.

Figure 6A:
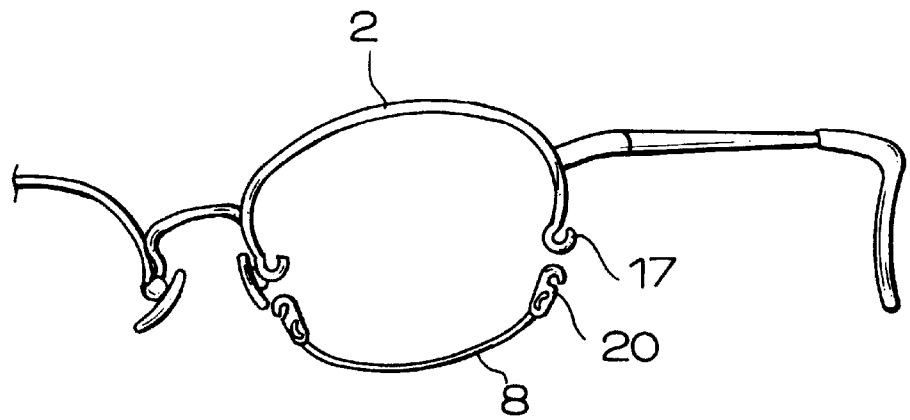
FIG. 6a is a perspective view of an eyeglass frame whose strings has engagement pieces fixed to their ends.
Figure 6B:
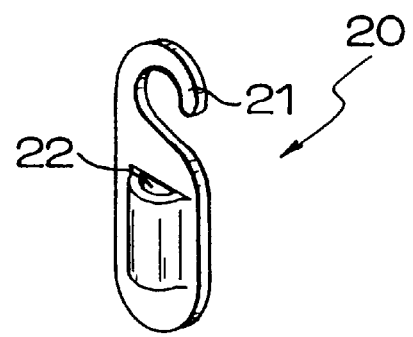
FIG. 6b shows the engagement piece.

Referring to FIG. 6(a), the string 8 has hook pieces 20 fixed to its opposite ends, and these hook pieces 20 are caught by the counter hook pieces 17, which are formed on the opposite ends of the upper half-rim of metal wire 2. As seen from FIG. 6(b), the hook piece 20 has a string passage 22 formed in its flat body, and a hook 21 formed at its upper end. The string end is inserted in the string passage 22, and then the string passage 22 is crimped to fasten the string end to the hook piece 20. This is a mere example, and should not be understood to be restrictive; the string end can be fastened to the hook piece by any other appropriate fastening means.

Figure 7:
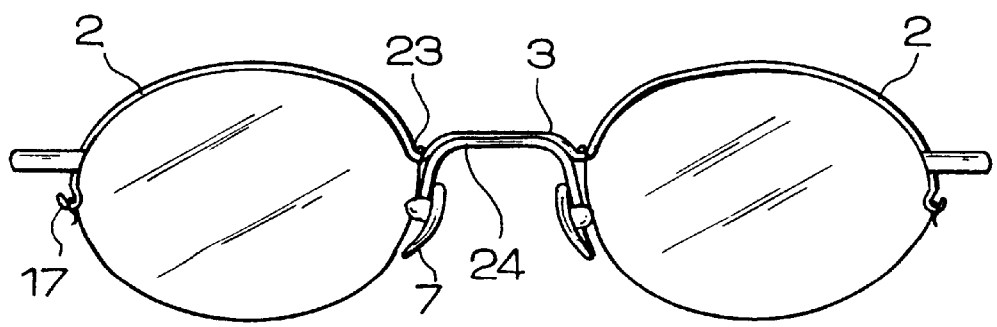
FIG. 7 is a front view of a pair of eyeglasses using a metal-and-string frame according to a second embodiment of the present invention.

Referring to FIG. 7, the two upper half-rims of arc-shaped metal wires 2 and the intervenient bridge 3 are composed of a single wire, which is large in diameter enough to be partly exposed from the circumferential groove of the associated lens. Each upper half-rim 2 has a temple-joint soldered to its outer side. Also, the upper half-rim 2 has a hook formed on its outer end and a re-entrant transition 23 from the bridge 3 to the upper half-rim 2. Each string has loops or engagement pieces formed on its opposite ends to be caught by the re-entrant transition 23 and the hook 17 of the upper wire rim 2. The bridge 3 has "U"-shaped metals 24 soldered to its opposite ends, and nose pads 7, 7 are swingably fixed to the "U"-shaped metals 24.

Figure 8:
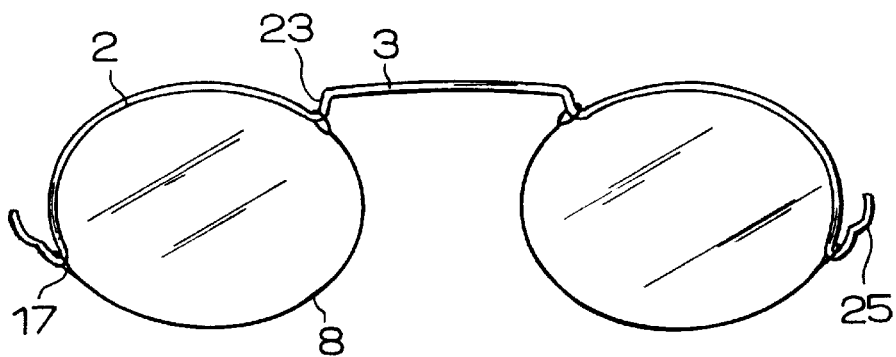
FIG. 8 is a front view of an extra pair of eyeglasses using a metal-and-string frame according to the second embodiment of the present invention.
Figure 9:
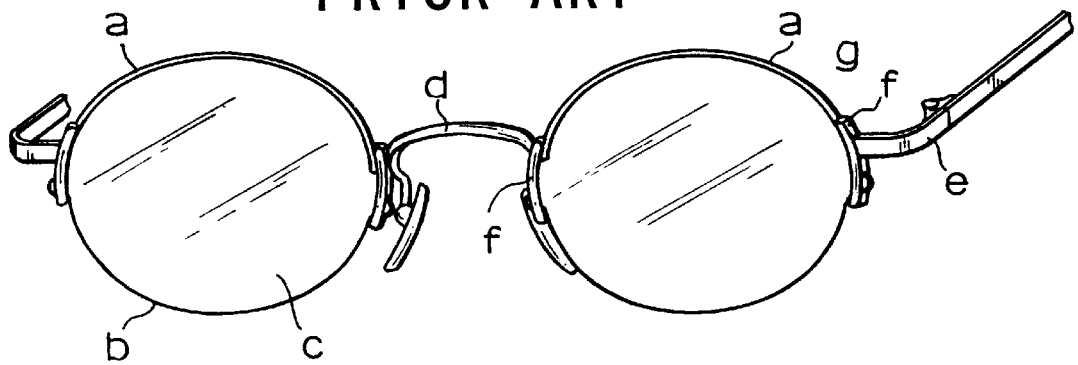
FIG. 9 is a perspective view of a pair of eyeglasses using a conventional metal-and-string frame.
Figure 10:
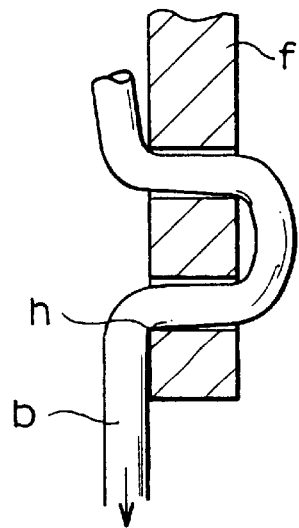
FIG. 10 shows how each string end is fastened to the upper rim in FIG. 9.

FIG. 8 shows an extra frame to be hanged on a pair of eyeglasses, and therefore, it has hooks 25 formed on its opposite sides in place of temples. It has no nose pads, either. It has re-entrant transitions 23 from the bridge 3 to the upper half-rims 2, and each string 8 has loops or engagement pieces formed on its opposite ends. The upper half-rims 2 and tension strings 8 are connected in the same way as in FIG. 7. The bridge 3 is straight, and is somewhat extended to give a good flexibility to the frame, thereby permitting the frame to be snugly fitted on a pair of eyeglasses.

As may be understood from the above, an eyeglass frame according to the present invention uses, on either side, a length of tension string having loops formed at its opposite ends to be caught by counter hooks, which are formed on the opposite ends of the upper half-rim. The hooking of the tension string has the effect of substantially increasing the pulling strength of the string encircling and holding the lens, thus permitting the string to be stretched with a force strong enough to hold the lens steadily without fear of loosening.

Also, the eyeglass frame uses, on either side, a length of relatively thick metal wire to be partly fitted in the circumferential groove of the lens, allowing the metal wire to be partly exposed, thereby permitting the bridge and temples to be soldered directly to the exposed portions of the metal wire. This arrangement has the effects of: significant reduction of manufacturing cost; giving a neat appearance to the frame; significant increase of the strength of the frame (attributable to use of relatively thick metal wire); even distribution of stress avoiding the cracking of lenses which otherwise, would be caused for instance, at the reinforcement pieces at which the stress is liable to be concentrated in the conventional structure.

What is claimed is:

1. An eyeglass frame having two upper half-rims of arc-shaped metal wires and two lower half-rims of high-tension strings to encircle and hold corresponding lenses, said two upper hatf-rims of arc-shaped metal wires being connected by an intervenient bridge, and each of said two upper half-rims having a temple connected thereto via an associated temple-joint, wherein each of said upper half-rims of arc-shaped metal wires having hooks formed on its opposite ends, and each of said lower half-rims of high-tension strings being hung on said hooks.

2. An eyeglass frame according to claim 1 wherein each of said lower half-rims of high-tension strings having loops formed on its opposite ends to be caught by the hooks of the upper half-rims.

3. An eyeglass frame according to claim 1 wherein each of said lower half-rims of high-tension strings having engagement pieces fixed to its opposite ends to be caught by the hooks of the upper half-rims.

4. An eyeglass frame according to claims 2 or 3 wherein each of said arc-shaped metal wires is large in diameter enough to be partly exposed from the circumferential groove of the corresponding lens, thereby allowing the exposed portions each of said arc-shaped metal wires to be connected directly to the intervenient bridge and the corresponding temple-joint by soldering.

5. An eyeglass frame according to claim 1 wherein said two upper half-rims of arc-shaped metal wires and the intervenient bridge being composed of a single wire, each upper half-rim having a hook formed on its outer end and a re-entrant transition from the bridge to the upper half-rim by which the lower half-rims of high-tension strings be caught at the opposite ends.

6. An eyeglass frame having two upper half-rims of arc-shaped metal wires and two lower half-rims of high-tension strings to encircle and hold corresponding lenses, said two upper half-rims of arc-shaped metal wires being connected by an intervenient bridge, wherein said two upper half-rims of arc-shaped metal wires and the intervenient bridge being composed of a single wire, which is large in diameter enough to be partly exposed from the circumferential groove of the corresponding lens, each upper half-rim having a hook formed identically on its outer end and a re-entrant transition from the bridge to the upper half-rim, wherein one of a loop and an engagement piece are formed on the opposite ends of each of said lower half-rims of high-tension strings to be caught by said re-entrant transition and said hook.

* * * * *